June 21, 1927. Re. 16,661

C. W. KAUTZ, JR

CIRCUIT RESTORING RELAY

Original Filed Jan. 27, 1919 4 Sheets-Sheet 1

WITNESSES:

R. S. Harrison

J. E. Foster

INVENTOR

Charles W. Kautz Jr.

BY

Wesley Clearr

ATTORNEY

June 21, 1927.

C. W. KAUTZ, JR

CIRCUIT RESTORING RELAY

Original Filed Jan. 27, 1919

Re. 16,661

4 Sheets-Sheet 2

WITNESSES:

R. S. Harrison

J. E. Foster

INVENTOR

Charles W. Kautz Jr.

BY

Wesley S. Carr

ATTORNEY

June 21, 1927. Re. 16,661

C. W. KAUTZ, JR

CIRCUIT RESTORING RELAY

Original Filed Jan. 27, 1919 4 Sheets-Sheet 3

WITNESSES:
R. S. Harrison
J. E. Foster

INVENTOR
Charles W. Kautz Jr.
BY
Wesley G. Carr
ATTORNEY

June 21, 1927. Re. 16,661

C. W. KAUTZ, JR

CIRCUIT RESTORING RELAY

Original Filed Jan. 27, 1919 4 Sheets-Sheet 4

WITNESSES:
C. J. Weller
E. R. Evans

INVENTOR
Charles W. Kautz, Jr.
BY
Wesley G. Carr
ATTORNEY

Reissued June 21, 1927. Re. 16,661

UNITED STATES PATENT OFFICE.

CHARLES W. KAUTZ, JR., OF LANCASTER, PENNSYLVANIA, ASSIGNOR TO WESTINGHOUSE ELECTRIC & MANUFACTURING COMPANY, A CORPORATION OF PENNSYLVANIA.

CIRCUIT-RESTORING RELAY.

Original No. 1,375,518, dated April 19, 1921, Serial No. 273,346, filed January 27, 1919. Application for reissue filed January 30, 1923. Serial No. 615,956.

This invention relates to means for restoring a line in an electric power system when, by reason of a momentary short circuit, (such as may result from a variety of causes, as, for example, a lightning discharge, a fallen limb across the line for a short duration, bridging of the wires by a buzzard or other bird of wide spread of wings,) the line is interfered with sufficiently to effect, through an overload or cutout relay, or a similar protective device, the operation of a main switch or circuit breaker in the line, and thereby kill the line although no serious and continued trouble exists.

It is an aim of the present invention to provide a restoring means of this type which will permit a predetermined number of automatic restorations of the main switch, such as an automatic oil switch having a remote control, so that in the event the cause for the short-circuit still exists after the first or any one of the successive restorations of the line, (in which instance the cutout protective device would again kill the line,) the line will again be restored; and if the trouble on the circuit has cleared after any one of the predetermined number of restorations, the main switch will remain closed and the load on the circuit uninterrupted. By repeatedly restoring the line, the total period of successive restorations covers a sufficient length of time to insure the line being restored to and maintained in service, provided the trouble is not serious or continued, and the line would not be thrown out of service for an extended period. The construction of my improved restoring device is such that the restorations secured thereby are limited to a predetermined number so that in the event the trouble in the line is of long duration and due to some serious cause, the device will not operate definitely, causing the short circuit to result in serious damage.

The present invention contemplates a restoring relay which is simple and compact in structure, all of the parts being brought together in a single unit; which may be used on either direct or alternating current of any standard control voltage; which may be readily regulated to time the reclosing of the line after the protective device has killed the line so as to insure that any short-circuit arc which may result from the trouble in the line is extinguished; and which, after it has been actuated, may be manually reset without interfering in any way with the operation of the system in which it is incorporated.

The present invention further resides in a system of wiring in which my improved restoring device comprises a component part.

As hereinafter described more in detail, my improved line reclosing or restoring device is particularly adapted for use in a system wherein the main switch for throwing a line or feeder into and out of operation has remote control means, such as a control switch, and a protective device is associated with the main switch in such a manner as to open the same when a short-circuit occurs in the line.

The above and other objects of my invention are obtained in the structure of my improved restoring device, and in the system of wiring described in the following specification, and illustrated in the accompanying drawings, in which:—

Figure 1:
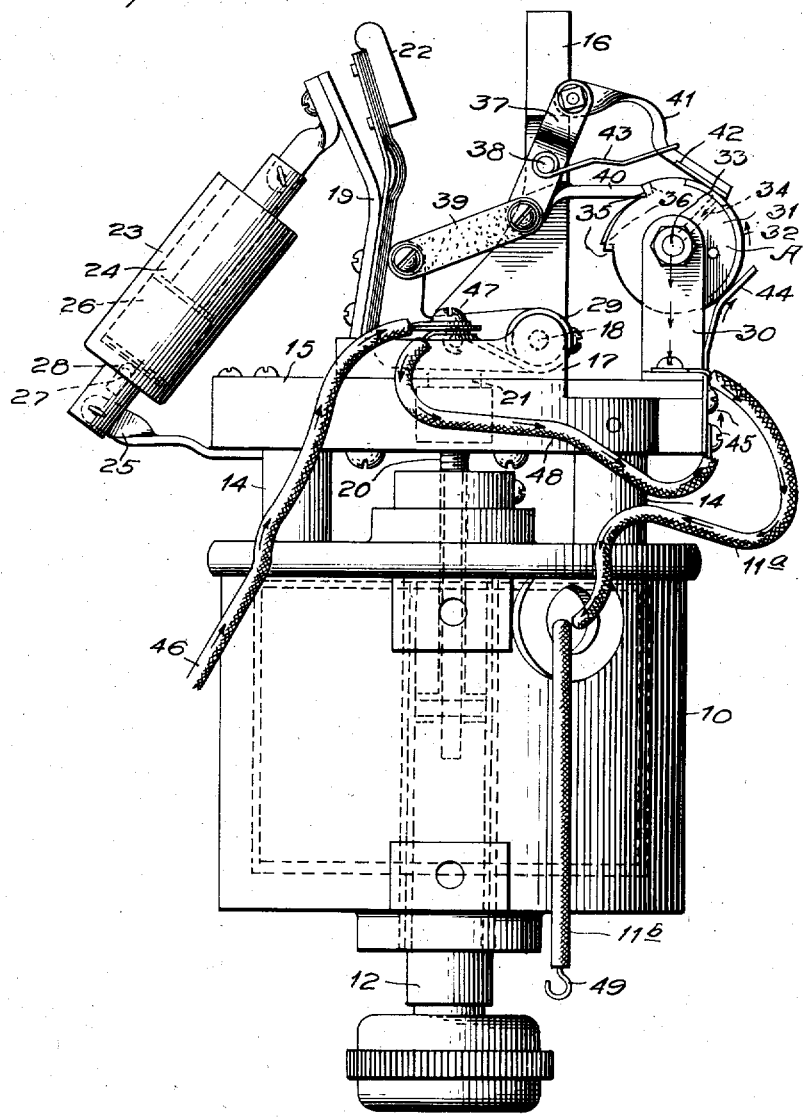
Figure 1 is a side elevational view of my improved restoring device or relay.
Figure 2:
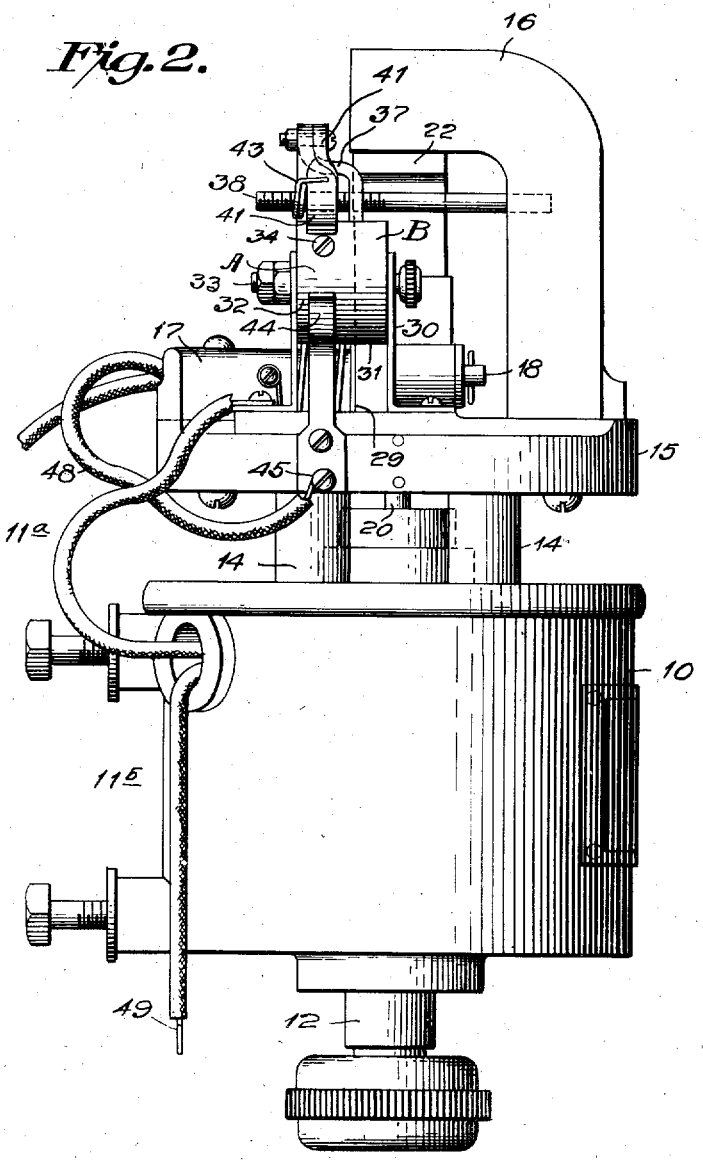
Fig. 2 is an elevational view taken on a plane at right angles of Fig. 1.
Figure 3:
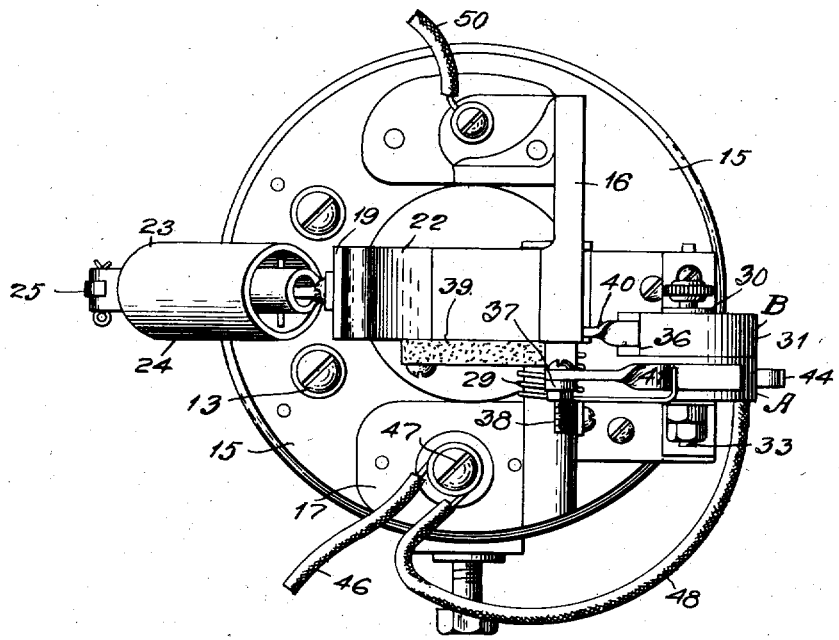
Fig. 3 is a top plan view of the relay.

Referring to the drawings in detail, wherein like reference characters denote like parts in the several views, 10 designates the solenoid casing of my restoring device, and within this casing is housed a solenoid or coil 11 having a core or armature 12 adapted to move upwardly upon energization of the coil, and downwardly under the influence of gravity when the coil is de-energized. Spaced above and secured to the top of the casing 10 by screws 13 passing through bushings 14, is a block 15 of ring-like shape constructed of suitable insulating material, such as hard rubber, or the like. Arising from one side of the ring 15 is a stationary arm 16 having its upper end bent laterally to form a contact with which a movable contact block 22 is adapted to engage. Attached to the ring 15 on the side opposite that of the arm 16, is a plate 17, having an inwardly extending stud 18 on which is pivoted a movable contact arm 19 of substantially L-shape. The upper end of the core 12 of the solenoid carries a rod 20 having a member 21 of insulating material against which the horizontal leg of the contact arm 19 engages so that when, upon energization of the coil 11, the core 12 is drawn upwardly, the contact arm 19 will be swung about the stud 18 to bring the contact block 22 against the arm 16 to thereby close the switch and cause energization of the solenoid of the automatic main switch, as hereinafter described.

For the purpose of delaying the operation of the restoring device until the potential in the line has been reduced, so as to insure that the arc, which may result from the short circuit, is extinguished before restoration of the line, the contact arm 19 is associated with a dashpot 23 which forces the arm 19 to slowly move into contact with arm 16 upon energization of the coil 11. This dashpot 23 may be of any suitable construction, that shown in the drawings, since it is by way of illustration only, being of an old and well known type. The dashpot is shown as having a cylinder 24 secured to an arm 25 carried by the ring 15, and a plunger or piston 26 fitting snugly within the cylinder 24 and connected to the free end of the contact arm 19. The closed end of the cylinder has a port 27 provided at its inner end with a valve seat with which a ball valve 28 is adapted to co-operate in such manner that as the piston is drawn from the cylinder the valve will be sucked against its seat to prevent the entrance of air through the port 27, and when the piston is forced inwardly of the cylinder 24, the air behind the piston may readily exhaust through the port 27.

Upon the stud 18 is a coiled spring 29, one end of which is secured to the contact arm 19, the spring being so disposed that upon de-energization of solenoid 11, it will cause the contact arm to swing way from the arm 16, forcing the plunger 26 into the dashpot and aiding the force of gravity in lowering the core 12 of the solenoid.

Figure 4:
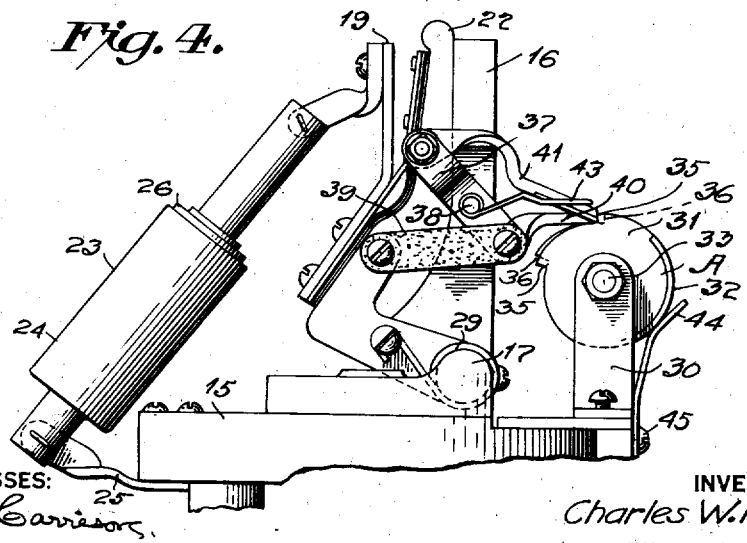
Fig. 4 is an elevational view showing in detail the mechanism which permits a predetermined number of actuations of the device.

To permit a predetermined number of restorations of the main switch in the short-circuited line, my restoration device is provided with means now to be described. Secured to the ring 15 rearwardly of the contact arm 16, are a pair of metallic brackets 30 in which is journaled a shaft 33 carrying a wheel 31, hereinafter referred to as the "counter." This counter is of fiber or other insulating material, and is divided longitudinally into two sections A and B. Upon the periphery of section A is a contact strip 32 electrically connected to the shaft 33 by a screw 34. Section A of the counter has a plurality of teeth 35, and while in the present instance these teeth are two in number, so that there may be two and no more restorations of the short-circuited line, the number of these teeth may be varied to obtain any desired number of automatic restorations. The other section B of the wheel or counter 31 has a like number of ratchet teeth 36, but these teeth are disposed somewhat forwardly of the ends of the teeth 35, as shown in Figs. 1 and 4.

The numeral 37 designates a lever pivoted intermediate its ends on a threaded rod 38 carried by the arm 16. The lower end of this lever is connected by means of a link 39 to the contact arm 19. Also pivotally connected to the lower end of the lever 37 is a pawl 40 which rides upon the periphery of section B of the wheel 31, and coacts with the teeth 36. Pivoted to the upper end of the lever 37 is a second pawl 41, which pawl 41 has an insulating block 42 to prevent electrical connection with the strip 32, and rides over the strip 32 and coacts with the ratchet teeth 35. A spring 43 resiliently maintains the free end of the pawl 41 against the periphery of the wheel 31. Coacting with the contact strip 32 is a brush 44 comprising a spring finger secured, by screws 45, to the periphery of the ring 15.

Current is led into my improved restoring device by means of wire 46 leading to the terminal contact or screw 47 carried by the metallic member 17. A wire 48 leads from the screw 47 to one of the screws 45, which secures the brush 44 to the ring 15. One end $11^a$ of the wire forming the coil 11 is electrically connected to one of the brackets 30, and the other end $11^b$ of the coil 11 may be provided with a hook 49 to which may be connected a variable resistance. Leading from the contact arm 16 is a wire 50 which, as will be described, leads to the wire in which the closing coil of the automatic switch is incorporated.

Figure 5:
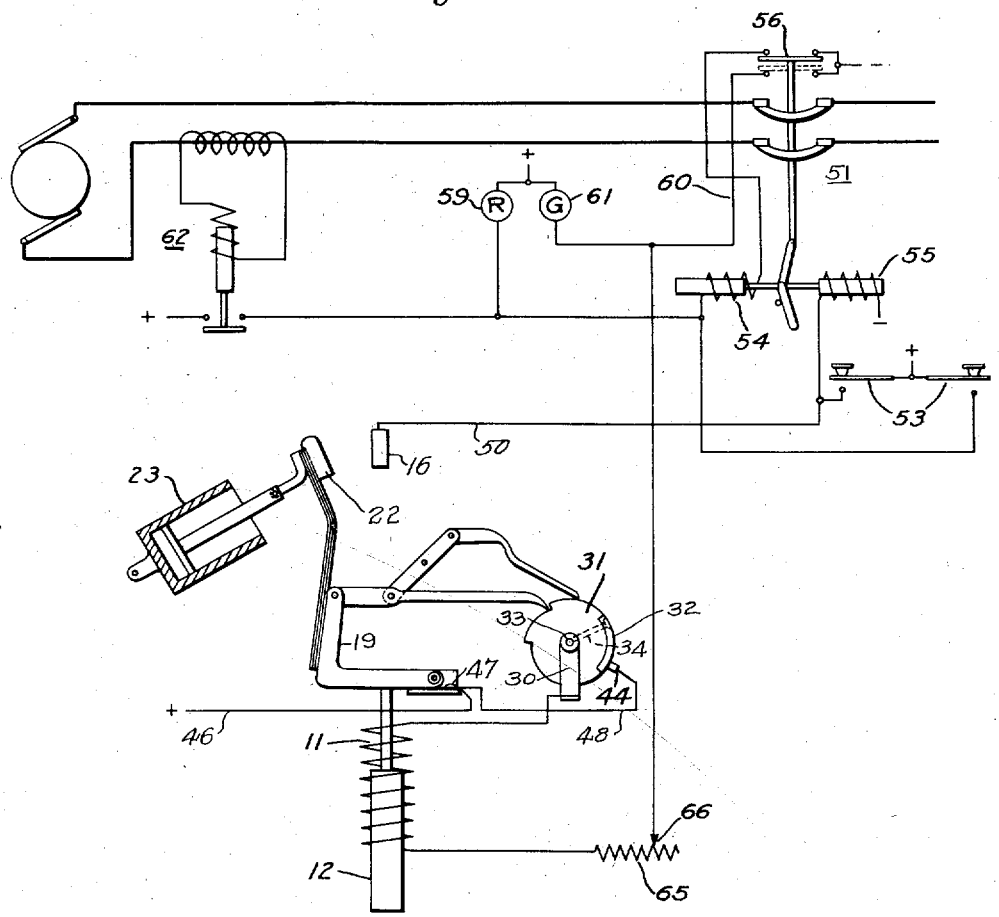
Fig. 5 is a diagrammatical view of a system of wiring in which my restoring means is used.

The operation of my improved relay is as follows: The counter 31 is normally in the position shown in Fig. 1, in which position the brush 44 is in contact with the forward end of the contact strip 32, and the pawl 40 is in engagement with the forward or first tooth 36 of section B of the wheel or counter 31. When the circuit in which the coil 11 is in series is closed, current passes through the wire 46, screw 47, wire 48, brush 44, contact strip 32, screw 34, bracket 30, and through the coil 11. Upon energization of the coil 11, this coil being energized as hereinafter described, when the remote main switch is opened, due to a short circuit, the core 12 will be drawn upwardly causing the arm 19 to swing around its pivot and bring the contact block 22 into engagement with the arm 16, whereupon current will pass through the wire 46, block 17, arm 19, block 22, arm 16, and out through the wire 50, so as to energize the closing coil 55 of the solenoid of the automatic switch 51, shown in Fig. 5 to close such switch. When the arm 19 is swung upwardly about its pivot, the pawl 40 is moved in a direction to cause a partial rotation of the wheel 31, and the pawl 41 is moved in the opposite direction to bring the end thereof into engagement with the forward tooth 35 of section A of the wheel 31, as shown in Fig. 4. Upon de-energization of the coil 11, the arm 19, under the influence of the spring 29, moves to its normal position, shown in Fig. 1, and this movement will cause the pawl 41 to move forwardly to rotate the wheel sufficiently to bring the second tooth 36 into position where the pawl 40 will coact therewith. When the coil 11 is again energized the arm 19 is raised the pawl 40, coacting with the second tooth 36, will partially rotate the wheel 31, and the pawl 41 will be brought into engagement with the second tooth 35. Upon a second de-energization of the coil, the arm 19 will swing downwardly, causing the pawl 41 to rotate the wheel 31 through an angle permitting the contact strip 32 to be moved out of contact with the brush 44, and thereafter the coil 11 cannot again be energized for the reason that the circuit is broken since the brush 44 is in engagement with the non-conducting body portion of the wheel 31. It will be seen that with the system of pawls above described, in the last operation of which the device is capable, the pawl 41 will give a partial rotation to the wheel 31, and the construction is such that this final movement is effected when the contact block 22 is thrown out of engagement with the arm 16, and after this movement is effected the contact strip 32 is out of engagement with the brush 44 so that the device cannot again operate until it is manually reset by rotating the counter 31 to bring the strip 32 into engagement with the brush 44.

The number of restorations of the line may be controlled by adjusting the counter 31. For instance, where the counter has two teeth, as disclosed in the present drawings, and it is desired that my reclosing relay make but a single restoration of the line short-circuited, the counter may be set manually so that the pawl 40 is in engagement with the second tooth 36 instead of with the first tooth, and then after the restoring device is operated once and the cutout or overload relay has again killed the line, there are no further restorations. As heretofore stated, the number of times that the restoring device will operate, depends upon the number of teeth, and this number may be increased as desired.

I will now describe the system of wiring of which my improved restoring relay is a part, but it is to be distinctly understood that while the incorporation of my restoring device in the present system of wiring forms a new and novel combination of elements to which I lay claim, my improved restoring device or relay may be used in other systems than that herein disclosed, and the restoring device being novel per se, some of the appended claims are drawn thereto.

The numeral 53 designates a manually operable control switch by means of which the automatic switch or circuit breaker, placed at a somewhat remote point, is opened and closed. In the present drawings, a trip coil 54, a closing coil 55, and a pilot switch 56 of a remote controlled automatic oil switch which may be of any desired type or construction are shown. The control switch 53 may be of any suitable type, and as I make no claim thereto per se, the same is illustrated more or less diagrammatically. A circuit may be traced from the control switch 53 through the closing coil 55 to the negative bus. The control switch 53 is connected to the positive bus. The trip coil 54 is also connected to a second contact member of the control switch 53. A red light 59 is connected in shunt relation to said contact member and is lighted when the automatic oil switch is closed to indicate that the line is in service. The pilot switch 56 is connected to the negative bus and when in its normal position,—that is, in the position shown in full lines, Fig. 5—connects the trip coil 54 to the negative bus. When the pilot switch is in the dotted line position shown in Fig. 5, which position it assumes when the main switch is open, current is closed through wire 60 in which is placed a green light 61, the green light indicating that the line is out of service. The numeral 62 indicates the protective device, the same being shown conventionally as it may be any standard cutout relay which will operate upon an overload in the line to be protected. The contacts of the cutout relay are respectively connected to the positive bus and the red light or trip coil circuit.

The solenoid 11 of my improved restoring relay is connected between the positive control bus and the pilot switch 56 in series with notching device 31. The main contact members of the relay are connected between the positive bus and the closing coil 55. The solenoid 11 is connected in series relation with a variable resistance 65 with which a contact lever 66, connected to the green light 61, is adapted to co-operate.

The operation of my improved restoring device in the system in which it is incorporated, is as follows: Assuming that the line is to be thrown into circuit, the control switch 53 is operated to send a current through the closing coil 55 of the automatic oil switch, whereupon this switch will close and the line will be thrown into operation.

Any suitable mechanism controlled by the trip coil 54, is used to maintain the main switch in closed position. Upon a short circuit of the line, the resultant overload will operate the cutoff relay 62 to close the contacts thereof, and thereupon current will flow through trip coil 54, energizing the same to actuate the trip which permits the automatic oil switch to open, thus killing the line. When the main switch is opened, the pilot switch 56 will be actuated, breaking the circuit through the trip coil and making a circuit pass through the wire 60. Thereupon the green light 61 will light to indicate that the line is out of circuit, and a circuit will be closed through the coil 11 to energize the same and raise the core 12 to effect engagement of its contact members, resulting in a flow of current through the closing coil 55 which, upon energization will automatically close the oil switch and restore the line.

The variable resistance 65 which may be supplied with either direct or alternating current control voltage, is used to lower the voltage that is supplied to the coil of the restoring relay, in order that the relay will not close the circuit to the closing coil of the main remote controlled oil switch until the contacts of the oil switch have opened far enough to extinguish the existing short circuit arc, this setting of the restoring relay being determined at the time of installation to meet the demands of the particular service in which it is installed. Where the dashpot 23 is employed, which dashpot serves the same purpose as the variable resistance, the latter may be dispensed with, but preferably, to insure proper operation, both the resistance and the dashpot are employed. If the source of trouble has been removed, the main switch will remain closed with the line in service, but should the source of trouble not be removed, the cutout relay 62 will again be automatically actuated to energize the trip coil 54, and thus open the main switch. The pilot switch 56 is thereupon actuated to close the circuit through the coil 11 and the restoring device will then operate to cause energization of the closing coil 55 and the resultant closing of the main switch. The cutout relay and the restoring device will alternately kill and restore the line until the trouble has been cleared, or, the trouble being of relatively long duration, until the restoring device, depending on the number of teeth on the counter 31 and the setting of this counter, has been actuated the predetermined number of times, whereupon the cutoff relay will again and finally kill the line.

It is, of course, obvious that my invention is susceptible of various modifications and changes which would be within the spirit of my conception without departing from the scope of the following claims, and that while I have shown a preferred embodiment, this disclosure is by way of illustration only and is not restrictive thereof.

I claim as my invention:

1. A circuit restoring device having switch contacts, a coil adapted when energized to close the contacts, and means in series with the coil and actuated by one of the contacts for permitting a predetermined number of actuations of the device.

2. A circuit restoring device having switch contacts, a solenoid for closing the contacts, and means for determining the number of actuations of the device, said means comprising a rotatable counter having a contact element for completing the circuit through the coil of the solenoid, and mechanism actuated by one of the contacts and coacting with the counter to move the latter after a predetermined number of actuations of the contacts to a position where the contact element is out of circuit.

3. A circuit restoring device having a solenoid, switch contacts adapted to be closed thereby, and means determining the number of actuations of the device, said means comprising a wheel having a contact strip adapted to complete the circuit through the coil of the solenoid and pawls actuated by the movement of one of the contacts and coacting with the wheel to rotate the latter, said pawls being so disposed that the wheel is given partial rotations upon both the closing and the opening movements of the contacts, the final movement of the wheel breaking the solenoid circuit when no current is flowing therein.

4. A circuit restoring device having a solenoid, switch contacts closed by the solenoid when the latter is energized, and means controlling the number of actuations of the device, said means comprising a counter having two series of teeth and a contact strip for completing the circuit through the coil of the solenoid, and a pawl for each series of teeth and actuated upon the movement of one of the contacts, one of said pawls rotating the counter upon a closing movement of the contacts, and the other upon an opening movement of the contacts, the contact strip breaking the circuit with the final opening movement of the contacts.

5. A circuit restoring device having switch contacts, a solenoid for closing such contacts, and means controlling the number of actuations of the device, said means comprising a wheel having two series of teeth and a strip adapted to complete the circuit through the coil of the solenoid, the teeth of one series being spaced slightly forwardly of the corresponding teeth of the other series, a lever pivoted intermediate its ends, a link connecting one end of the lever to one of the contacts, a pawl connected to the lower end of the lever and coacting with the teeth of the first-mentioned series, and a pawl connected with the other end of the lever and coacting with the teeth of the second series, said pawls being so disposed that upon the last actuation of the device the last-mentioned pawl will move the contact strip out of circuit.

6. A circuit restoring device having a pair of contact members one of which is fixed and one movable, a solenoid, a plunger therefor engaging the movable contact member to move it into contact with the fixed contact member when the solenoid is energized, means for retarding such movement, means for restoring the said moving parts when the solenoid is de-energized, and means for breaking the circuit through the solenoid after a predetermined number of actuations of the device.

7. A circuit restoring device comprising a switch normally open, a solenoid arranged to close said switch when energized, and manually adjustable means for limiting the number of actuations of the switch, comprising a rotatable disk having a series of teeth and an arcuate contact strip, a pair of pawls actuated by one of the switch contacts for rotating said disk on opening and closing movements of the switch, and a brush coacting with said contact strip, said brush and strip being in series with the solenoid and breaking the solenoid circuit upon the final opening movement of the switch.

8. In combination, a trip coil, closing coil, and pilot switch of a main switch; a protective device associated with the trip coil and adapted to actuate the same to open the main switch when an overload occurs in the line of the main switch; and a restoring device having a solenoid adapted to be actuated upon energization of the trip coil, and contacts closed upon energization of the solenoid and in series with the closing coil of the main switch.

9. In combination, a trip coil, closing coil, and pilot switch of a main switch; a protective device associated with the trip coil and adapted to actuate the same to open the main switch when an overload occurs in the line of the main switch; and a restoring device having a solenoid adapted to be actuated upon energization of the trip coil, contacts closed upon energization of the solenoid and in series with the closing coil of the main switch, and a variable resistance in series with the coil of the solenoid for delaying the closure of the contacts until the current of the line has substantially reached zero.

10. In combination, a trip coil, closing coil, and pilot switch of a main switch; a protective device associated with the trip coil and adapted to actuate the same to open the main switch when an overload occurs in the line of the main switch; and a restoring device having a solenoid adapted to be actuated upon energization of the trip coil, contacts closed upon energization of the solenoid and in series with the closing coil of the main switch, and means controlling the number of times the solenoid is energized.

11. In combination, a trip coil, closing coil, and pilot switch of a main switch; a protective device associated with the trip coil and adapted to actuate the same to open the main switch when an overload occurs in the line of the main switch; and a restoring device having a solenoid adapted to be actuated upon energization of the trip coil, contacts closed upon energization of the solenoid and in series with the closing coil of the main switch, and means in series with said solenoid and actuated by the movements of the contacts for controlling the number of restorations of the line.

12. In combination, a remote controlled switch having a closing coil, trip coil, and pilot switch; a remote control switch; a red light line leading from the control switch to the trip coil; a green light line leading from the control switch to the pilot switch; a line leading from the control switch to the closing coil; a positive and a negative control bus; a protective device having contacts connected to the positive bus and red light line; and a circuit restoring device having a coil connected between the green light line and positive bus, and a switch between the positive bus and the line leading to the closing coil and actuated by said last mentioned coil.

13. In combination, a remote controlled switch having a closing coil, trip coil, and pilot switch; a remote control switch: a red light line leading from the control switch to the trip coil; a green light line leading from the control switch to the pilot switch, a positive and a negative control bus; a protective device having contacts connected to the positive bus and red light line; and a circuit restoring device having a relay coil connected between the green light line and positive bus, contact members actuated by said relay coil and connected to the positive bus and the line leading to the closing coil, and means in series with the relay coil and actuated by the contact members for controlling the number of restorations of the line.

14. In combination, a main switch having a pilot switch, an overload trip coil and a closing coil therefor, and an automatic restoring device comprising a control switch for the closing coil, electromagnetic means for operating the control switch, means including said pilot switch for controlling the energization of the electromagnetic means upon the opening of the main switch, and means for predetermining the number of times the control switch is operated.

15. The combination with a circuit interrupter provided with a closing coil and an electromagnetic relay switch comprising contact members for controlling the circuit thereof, of means for operating the contact members of the relay switch when the interrupter opens and a notching circuit-control device operated by the electromagnet of said relay switch to limit the number of times the circuit of the closing coil is reclosed.

16. The combination with a main switch having a pilot switch and means for automatically tripping the main switch under predetermined conditions, of means for reclosing the main switch, and controlling devices for energizing said reclosing means comprising means energized by the pilot switch when said main switch is actuated and a notching circuit-control device operative to limit the number of times the reclosing means may be re-energized.

In testimony whereof, I have hereunto subscribed my name this 12th day of January, 1923.

CHARLES W. KAUTZ, Jr.